United States Patent
Biancella et al.

(10) Patent No.: US 8,367,176 B1
(45) Date of Patent: Feb. 5, 2013

(54) REPOSITIONABLE, SELF-ADHESIVE WALLPAPER

(75) Inventors: Julia Nicole Biancella, Brick, NJ (US); Jennifer Michelle Biancella, Brick, NJ (US); Katherine Madeline Szilagyi, New York, NY (US)

(73) Assignee: Lolliprops, Inc., New York, NY (US)

( * ) Notice: Subject to any disclaimer, the term of this patent is extended or adjusted under 35 U.S.C. 154(b) by 165 days.

(21) Appl. No.: 12/724,132

(22) Filed: Mar. 15, 2010

Related U.S. Application Data (60) Provisional application No. 61/209,976, filed on Mar. 13, 2009.

(51) Int. Cl.
*B32B 9/00* (2006.01)
*B32B 33/00* (2006.01)

(52) U.S. Cl. .............. 428/40.1; 428/42.1; 428/904.4; 428/906

(58) Field of Classification Search ............. 428/904.4, 428/906, 40.1, 42.1, 343
See application file for complete search history.

(56) References Cited

U.S. PATENT DOCUMENTS

| | | | |
|---|---|---|---|
| 3,574,656 A | | 4/1971 | Saunton et al. |
| 4,054,697 A | * | 10/1977 | Reed et al. .............. 428/41.8 |
| 4,783,354 A | * | 11/1988 | Fagan .................... 428/40.5 |
| 4,857,371 A | * | 8/1989 | McClintock ............ 428/36.5 |
| 5,413,829 A | * | 5/1995 | Brown et al. ............ 428/40.6 |
| 5,487,929 A | | 1/1996 | Rusincovitch et al. |
| 5,639,539 A | | 6/1997 | DeProspero et al. |
| 5,676,787 A | | 10/1997 | Rusincovitch et al. |
| 5,866,220 A | | 2/1999 | Rusincovitch et al. |
| 6,194,064 B1 | | 2/2001 | Keely et al. |
| 7,132,142 B2 | * | 11/2006 | Truog et al. .............. 428/40.1 |
| 2006/0213101 A1 | * | 9/2006 | Sobonya et al. ............ 40/594 |

OTHER PUBLICATIONS

Lubrizol Advanced Materials, Inc., Hycar 26172, Acrylic Emulsion technical data sheet, downloaded from the Internet at www.lubrizol.com/Coatings/DataSheets/Hycar.html on Nov. 13, 2012.
Lubrizol Advanced Materials, Inc. Hycar 26-0202, Acrylic Emulsion technical data sheet, downloaded from the Internet at www/lubrizol.com/Coatings/DataSheets/Hycar.html on Nov. 13, 2012.
Lubrizol Advanced Materials, Inc., Hycar 26-1475, Acrylic Emulsion technical data sheet, downloaded from the Internet at www.lubrizol.com/Coatings/DataSheets/Hycar, html, on Nov. 13, 2012.
Lubrizol Advanmced Materials, Inc., Hycar 26319 Acrylic Emulsion technical data sheet, downloaded from the Internet at www/lubrizol.com/Coatings/DataSheets/Hycar.html, on Nov. 13, 2012.
Lubrizol Advanced Materials, Inc., Hycar FF-26903, Acrylic Emulsion technical data sheet, downloaded from the Internet at www/liubrizol.com/DataSheets/Hycar.html, on Nov. 13, 2012.

* cited by examiner

*Primary Examiner* — Patricia Nordmeyer
(74) *Attorney, Agent, or Firm* — Benjamin Appelbaum (57) ABSTRACT

A repositionable, self-adhesive wallpaper can be applied to a surface, positioned, repositioned, and can be removed without damaging the underlying surface, allowing the user to change wallpaper designs periodically. Embodiments comprise a vinyl sheet having front and rear surfaces, the front surface having a surface coating that is capable of having an image printed thereon; a removable backing layer comprising a clay coated kraft paper and a release agent; and a pressure sensitive adhesive disposed between the sheet rear surface and the backing layer, the adhesive being an acrylic emulsion adhesive applied to the rear surface, such that after the backing layer has been separated to expose the adhesive the surface covering can be applied to a surface, and the applied surface covering can be removed from the surface and the surface covering can be repositioned and/or reused.

4 Claims, 7 Drawing Sheets

REPOSITIONABLE, SELF-ADHESIVE WALLPAPER

CROSS-REFERENCES TO RELATED APPLICATIONS

This application claims the benefit of U.S. Provisional Application for Patent Ser. No. 61/209,976, filed on 13 Mar. 2009, by the present inventors. The contents of this provisional application are hereby incorporated by reference herein in their entirety.

FIELD OF THE INVENTION

Embodiments of the present invention relate to a repositionable, self-adhesive wallpaper that encompasses adhesive glue. This adhesive glue allows for the paper to be reused and repositioned over extended periods of time.

BACKGROUND OF THE INVENTION

Surface coatings, such as wallpapers are commonly used for their decorative function, but have several problems associated with them. While some of these problems deal with the application of the product to a particular surface, others relate to the removal of the attached product, either during application for making adjustments, or at a later date. Some types of wallpaper need to be applied using an adhesive, commonly referred to as a paste, that needs to be applied, usually in a wetted state, to the back of the wallpaper prior to its' application. The use of this type of wallpaper frequently requires that the receiving surface be treated with a sizing agent prior to application, to facilitate the adhesion of the wallpaper to the surface. The application of the paste to the wallpaper requires certain tools, including measuring and cutting tools, and a brush and water source for activating the paste, for example. Also, application of this type of wallpaper is best performed by persons skilled in doing so, rather than a typical consumer.

Some wallpapers are distributed as "prepasted", meaning that they contain a layer of an adhesive on their back surfaces, which has to be wetted prior to application of the wallpaper to the particular surface. As in the case of wallpaper that is not prepasted, the use of prepasted wallpaper may also require additional preparation of the wall surface to facilitate the adhesion of the wallpaper, and the need for application by a skilled person. Since most wallpapers contain a design, it is often difficult when applying a second sheet of wallpaper to align the sheets such that the design is properly aligned; it is often difficult to move and/or reposition wet sheets of wallpaper while doing so.

Consequently, many types of wallpaper are difficult for the average person to apply. Once the wallpaper is attached to the wall surface, if the job have been done properly, the wallpaper will remain attached to the wall, and can be difficult to remove. If removal is not done properly, the underlying walls can be easily damaged. For individuals living in an apartment, such damage, for example, prior to vacating the apartment, could result in a loss of a security deposit. For individuals who are somewhat transient, but would like to decorate the walls of their residence, the use of wallpaper, while desirable, may not be practical because of the issues associated with its' application and removal from the walls.

The prior art contains references to the use of pressure sensitive adhesives with wallpaper to produce a repositionable product. However, the pressure sensitive adhesives used are frequently distributed on the backing as localized droplets, rather than a smooth layer on the surface, and most tend to employ a microsphere adhesive. Further, the microsphere adhesives are more commonly used on items such a decorative borders or decals, rather than on a wallpaper, which is intended to cover a greater surface area than a border or decal.

Thus, there is a need for a wallpaper product which can be readily applied to a wall surface by the typical user, and which can be repositioned without damaging the wall surface. Embodiments of the present invention meet this need by providing a repositionable wall paper which the average user can apply, and later reposition as desired, without causing significant damage to the underlying wall surface.

BRIEF SUMMARY OF THE INVENTION

Embodiments of the present invention include a repositionable self-adhesive wallpaper. It is easy to position and reposition, and can be easily removed without damaging the underlying surface. Embodiments of the present invention allow the user clientele to change wallpaper designs on the chosen surface daily, weekly, monthly and annually without any mess or fuss in adhering it. The creative designs on the wallpaper appeal to a vast target market.

Embodiments comprise a vinyl sheet having front and rear surfaces, the front surface having a surface coating that is capable of having an image printed thereon; a removable backing layer comprising a clay coated kraft paper and a release agent; and a pressure sensitive adhesive disposed between the sheet rear surface and the backing layer, the adhesive being an acrylic emulsion adhesive applied to the rear surface, such that after the backing layer has been separated to expose the adhesive the surface covering can be applied to a surface, and the applied surface covering can be removed from the surface and the surface covering can be repositioned and/or reused.

DETAILED DESCRIPTION OF THE INVENTION

Embodiments of the present invention are a repositionable, self-adhesive wallpaper, and which is marketed under the trademark of TEMPAPER® (registered trademark of Lolliprops, Inc., New York, N.Y., the assignee of the present application). Unlike conventional wallpaper pastes, or the pastes found on prepasted wallpapers, the adhesive used with the present invention enables the wallpaper to be reused and repositioned over an extended period of time.

Wallpapers comprise a decorative layer, onto which a design has been printed using any one of a number of conventional printing methods, and are attached by means of an adhesive to the surface of a wall. However, because wallpapers can also be attached to ceilings or other surfaces, for the purposes of this specification, the term "wall" is intended to have its common meaning when referring to the interior wall of a building, room, or other structure. It is also intended to include other surfaces, such as a ceiling, and can include the exterior wall of a building, room, or other structure. Additionally, wall is also intended to encompass any solid surface capable of receiving an adhesive-backed piece of a decorative material, such as a wallpaper, and this can include, for example only and not intended as any limitation, plastics, films, glass, painted metals, billboards, cabinets, ceilings, doors, drawers, fences, paneling, panels, partitions, shelves, signs, vehicle siding and the like.

Figure 1:
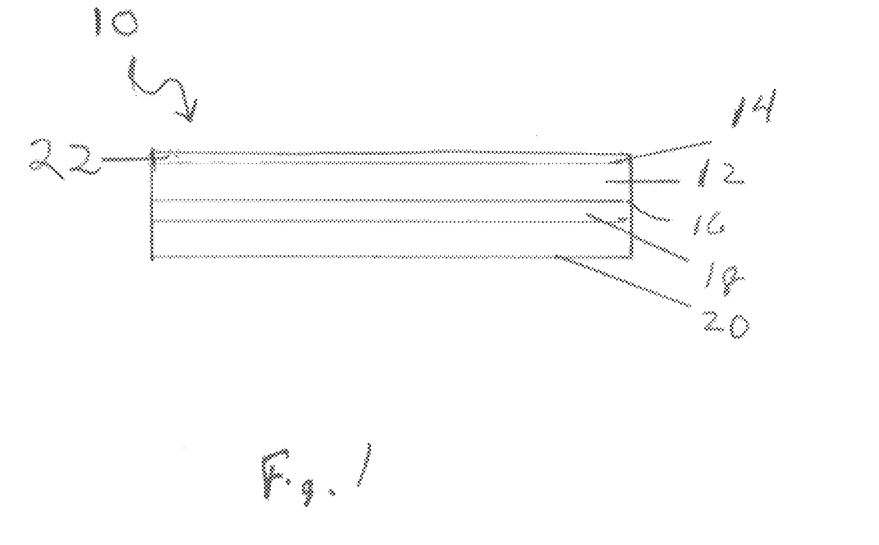
FIG. 1 is a schematic illustration of an embodiment of the present invention.

Referring to FIG. 1, the wallpaper 10 comprises a sheet of material 12, such as a paper or vinyl, that has a front, or decorative surface 14 and a rear surface 16. Rear surface is coated with a layer of adhesive 18, and a backing (release) layer 20 is attached to the adhesive layer 18 and prevents the adhesive 18 from sticking to the front surface 12 when the wallpaper is packaged, generally as a roll. A topcoating 22 may be applied to front surface, and is the surface onto which the decorative indicia (not shown) are printed.

Embodiments of the present invention are distributed in rolls, generally having a width ranging from about 18 inches to about 30 inches. The rolls generally have a length ranging from about 15 feet to about 40 feet, as is typical of most wallpaper products. In one embodiment, the rolls are about 21 inches wide and about 35 feet in length.

Sheet 10 comprises a paper stock, which could be selected from a number of commercially available products. Applied to the paper stock can be one of more of a variety of flexographic surface treatments manufactured by Wausau Coated Products, Wausau, Wis., such as ST200, ST250, ST300, ST320 and ST350 products. The topcoating is applied to the paper stock in a quantity sufficient to form a smooth coating on the front surface. The ST250 and ST350 products have a matte finish. The ST300 and ST320 have a glossy finish. In one embodiment of the present invention, the ST300 glossy coating is applied to the paper stock. The paper stock is a 3.4 mil white matte polymeric vinyl product, produced by Mississippi Polymers, Corinth, Miss., and according to a distributor, Wausau Coated Products, Wausau, Wis., and incorporated by reference herein, this paper stock is a white flexible vinyl with a high heat resistance and top coated for black laser printing applications, and suitable for flexographic and offset printing. Its properties include a caliper per mil of 3.4. The tensile strength PSI, MD/TD is 3,100-4,500/2,700-4,000, and its elongation rate, % MD/TD, is 70-170/150-335. The % shrinkage when heated at 212 degrees F. for ten minutes is 6% maximum, and its optical densitometer is 0.60 mm. The regulatory compliances for ST300 are CONEG, ROHS, and NAFTA.

The sheet 12 is referred to as a vinyl paper. As used in the present specification, the term "vinyl" is intended to include wallpapers prepared from a polymer formed from one or more acrylic or vinyl monomers, such as vinyl chloride, vinyl acetate, or various vinyl esters. Examples of vinyl esters include vinyl acetate, vinyl propionate, vinyl butyrate, vinyl laurate and vinyl pivalate. The vinyl monomers may be copolymerized with other monomers, such as unsaturated carboxylic acid esters, such as acrylic acid and methacrylic acid, and/or monomers such as ethylene and propylene, or a combination of paper with a polyvinyl chloride or polyester.

The adhesive should be able to provide an adequate adhesion of the repositionable wallpaper to the desired surface, yet allow the wallpaper to be removed from the surface at a later time. Examples of adhesive which might be used are rubbers, such as either synthetic or natural rubbers with the addition of a tackifying agent; polyvinyl alkyl ethers, vinyl acetate copolymers and acrylic ester polymers and copolymers thereof. Some emulsions of acrylic ester polymers or copolymers might be used, such as butyl acrylate, copolymers of 2-ethyl-hexyl acrylate or heptyl acrylate.

The adhesive 18 can be selected from either a microsphere based adhesive, such as the R150 or R152 adhesives manufactured by Wausau Coated Products, Wausau, Wis. described as emulsion acrylic microsphere adhesives Wausau, Wis., or their equivalents available from other manufacturers, or an acrylic emulsion adhesive, such as the R-2150, R-2211, or R-7211 adhesives manufactured by Wausau Coated Products, Wausau, Wis. Embodiments of the present invention utilized the Wausau R-2211 adhesive.

According to its manufacturer, and which information is incorporated by reference herein, the R-2211 adhesive is a general purpose and acrylic emulsion adhesive that can be utilized for removable applications. The product is recommended for use as a shelf marking applications, and is stated to have a good initial tack and adhesion to papers. The R-2211's adhesion to rigid plastics, films, glass and painted metals is good. It has an alkaline pH, a minimum application temperature of +20 degrees F., and a service temperature range from 0 degrees F. to +150 degrees F. Its regulatory Compliances are FDA 21, CFR 175, 105, 176, 170, and 180 for incidental food contact, CONEG, Heavy Metals, ASTM F963a, and Child Toy Safety. It includes an acrylate copolymer dispersion, and one or more tackifiers in an adhesive composition.

The adhesive is applied to the rear surface 16 of sheet 12 using a conventional application process, such as either a roll coating process or a knife coating process, and the liner attached to the adhesive coated vinyl, using methods that are known to those skilled in the art, and which will not be further described. The adhesive is applied to the vinyl at a coating weight ranging from about 11 to about 13 pounds, with an applied quantity being 0.002 to about 0.004 pounds per square foot. In one embodiment of the present invention, the adhesive is applied at 0.00364 pounds per square foot. Adhesives that are applied using a higher coating weight do not have the desired properties of being repositionable, but tend to be a more permanent type of adhesive. Adhesive applied with a lower coating weight would most likely lead to failure of the wallpaper product, due to insufficient adhesive to support the weight of the wallpaper to the wall surface.

The third component is the liner backing (or release layer) 20 which protects the adhesive when embodiments of the present invention are packaged, and the liner backing 20 is peeled off when the paper is being applied. The liner is a clay-coated bleached kraft liner designed for roll-to-sheet applications, and according to its manufacturer, is claimed to have good back printability. A number of liner backings could be utilized with the present invention, and in one embodiment, the backing is an 80 pound, 4.2 mil thick, clay coated release liner, available from New Page Corp., Miamisburg, Ohio. The liner can have a thickness (caliper) ranging from about 3 mil to about 6 mil. In one embodiment of the present invention, the liner had a thickness (caliper) of 5 mil. In another embodiment of the present invention, the liner had a thickness (caliper) of 4.2 mil.

The liner is a 4.2 mil caliper paper, whose properties are described by the manufacturer as having a basis weight (25× 38/500) lbs of 86.0, 79% brightness, and a gloss (at 75 degrees F.) of 60. Its regulatory Compliances are FDA21, CFR 175, 105 for incidental food contact, CONEG Heavy Metals, ASTM F963A, Child Toy Safety and NAFTA. The liner is supplied with a layer of silicone, which can be either an ultraviolet cured or thermally cured silicone composition, as known to those skilled in the art.

An embodiment prepared with the 4.2 mil liner was found to have the best lay flat characteristic, that is, it would lay flat against the wall. While a thinner liner, such as a 3 mil liner would function adequately, the applied vinyl could develop a curl in it after it has been applied to the wall. Similarly, a thicker liner, such as a 5 mil liner, could also result in the vinyl developing a curl after having been applied to the surface of the wall.

Application of the Repositionable Wallpaper.

Prior to application, the surface should be clean and dry. To obtain optimum performance, the surface should be primed and painted. in order to obtain optimum results.

Embodiments of the present invention are distributed in rolls, generally having a width ranging from about 18 inches to about 30 inches. The rolls generally have a length ranging from about 15 feet to about 40 feet, as is typical of most wallpaper products. In one embodiment, the rolls are about 21 inches wide and about 35 feet in length.

Figure 2:
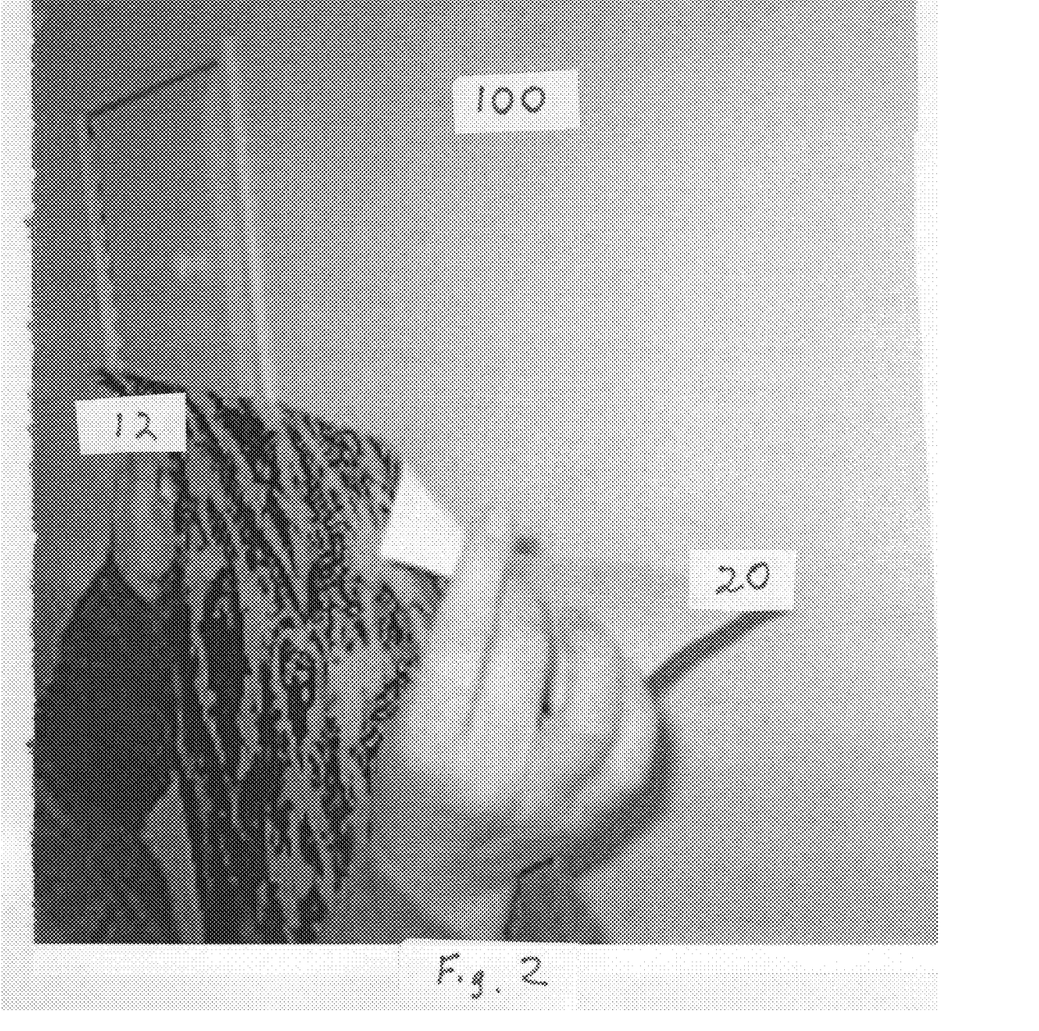
FIG. 2 shows the liner having been peeled back, prior to application to a wall surface.
Figure 3:
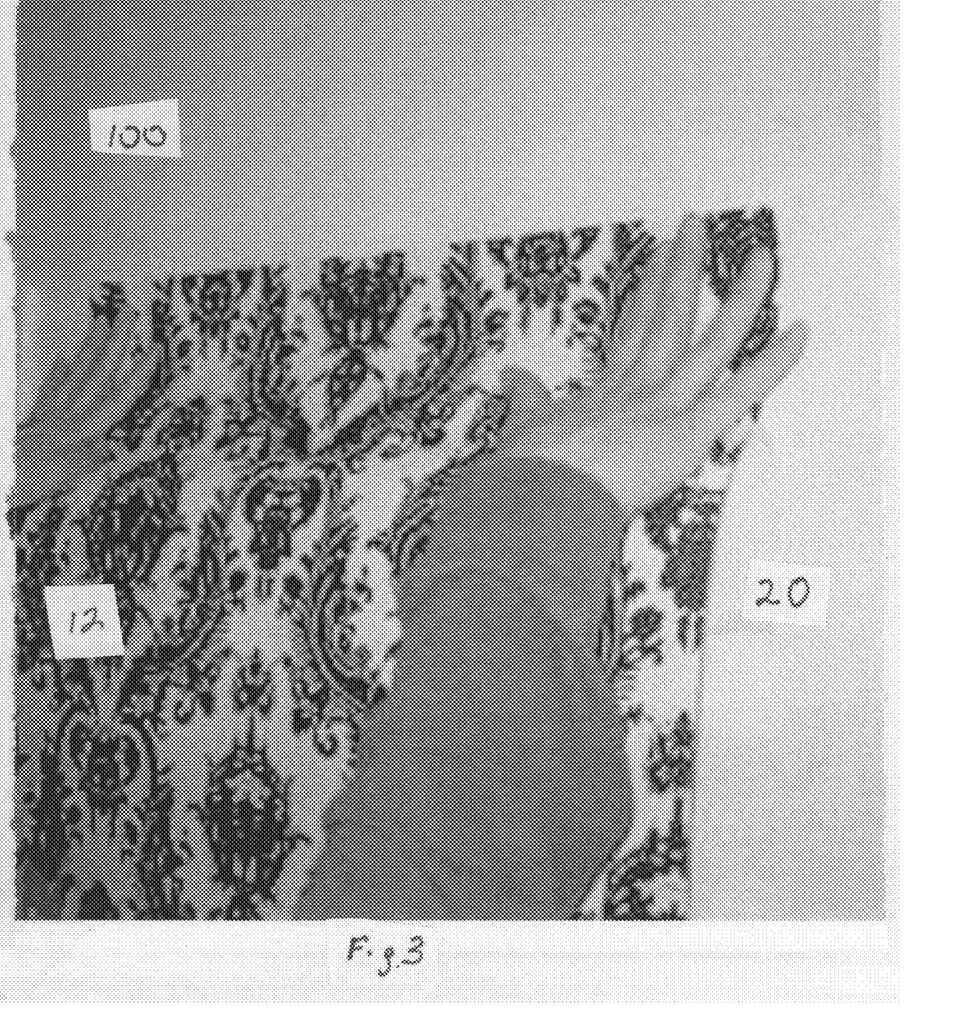
FIG. 3 shows the initial placement on to a wall surface.

To apply this wallpaper, the user can either start with the entire roll, or work with a specific length of the wallpaper, and at what will be the top two corners, peels the backing 20 off of the top two corners about six inches. FIGS. 2-6 illustrate the application process. To get a good start, the user can peel the backing anywhere from about 3 inches to about 30 inches (FIG. 2). Alternatively, the user can peel the backing anywhere from about 6 inches to about 24 inches, or as another alternative, from about 7 inches to about 12 inches. The user applies the released wallpaper to the top of the surface 100, which will generally be near the ceiling of the room. Embodiments of the present invention can be applied to the ceiling of a room.

Figure 4:
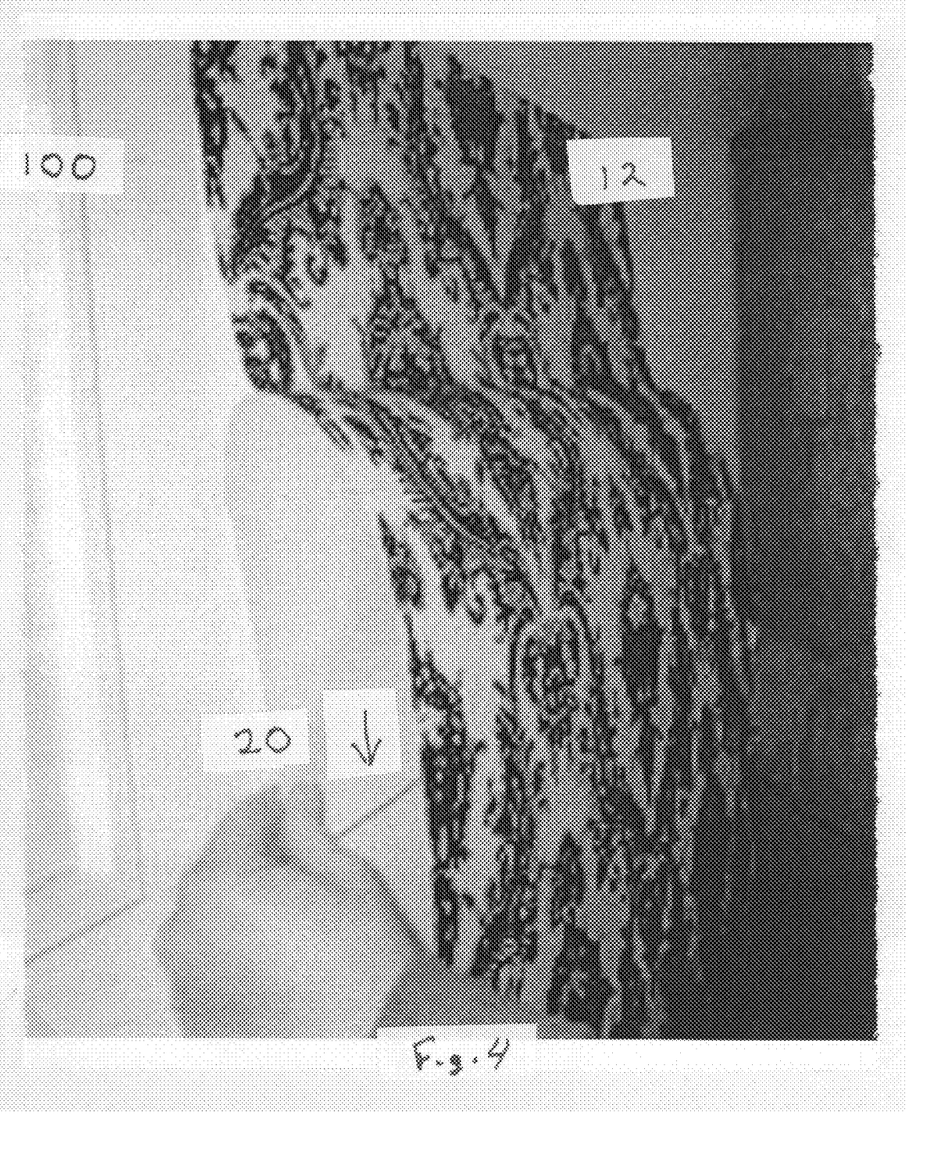
FIG. 4 shows the liner continuing to be peeled back as the embodiment of FIG. 1 is being applied to a wall surface.
Figure 5:
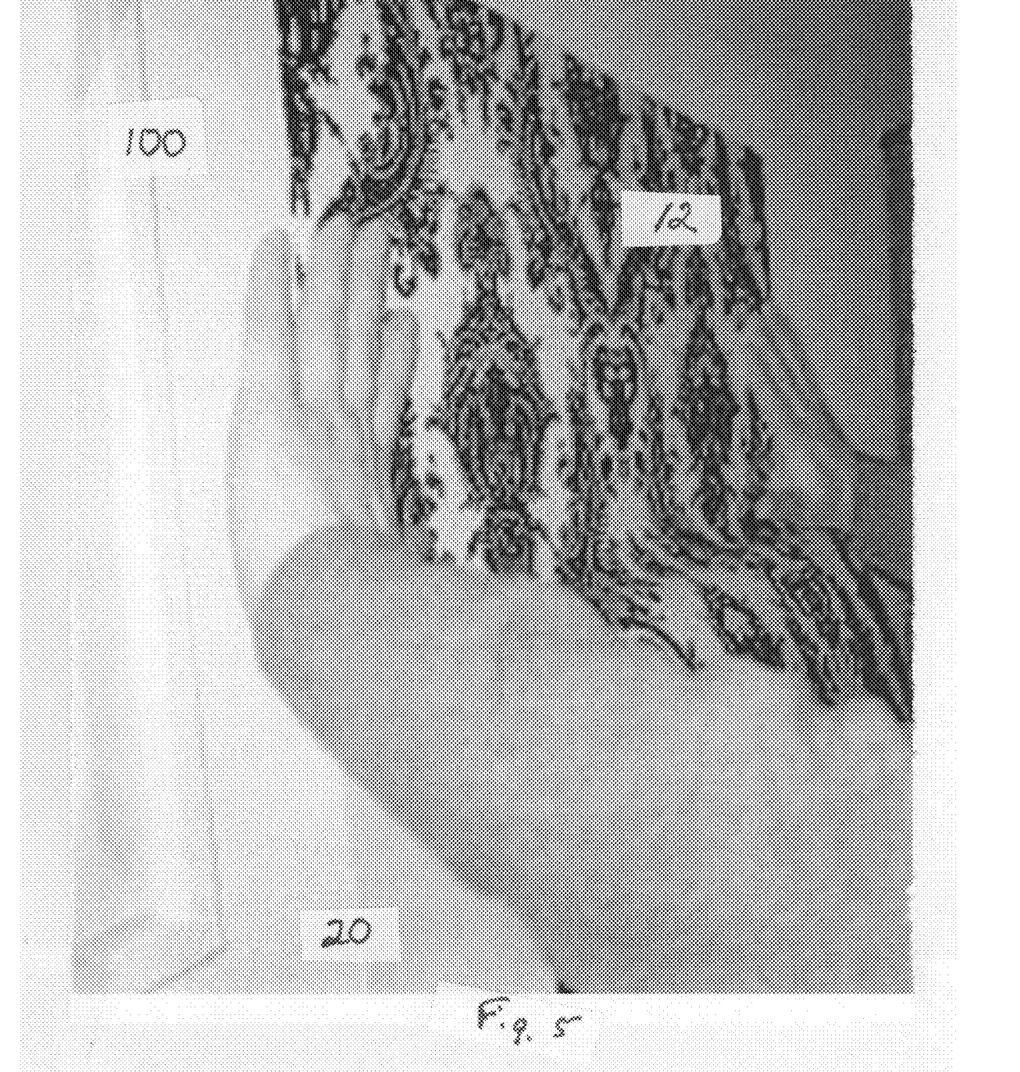
FIG. 5 shows part of the smoothing process as the embodiment of FIG. 1 has been applied to a wall surface.
Figure 6:
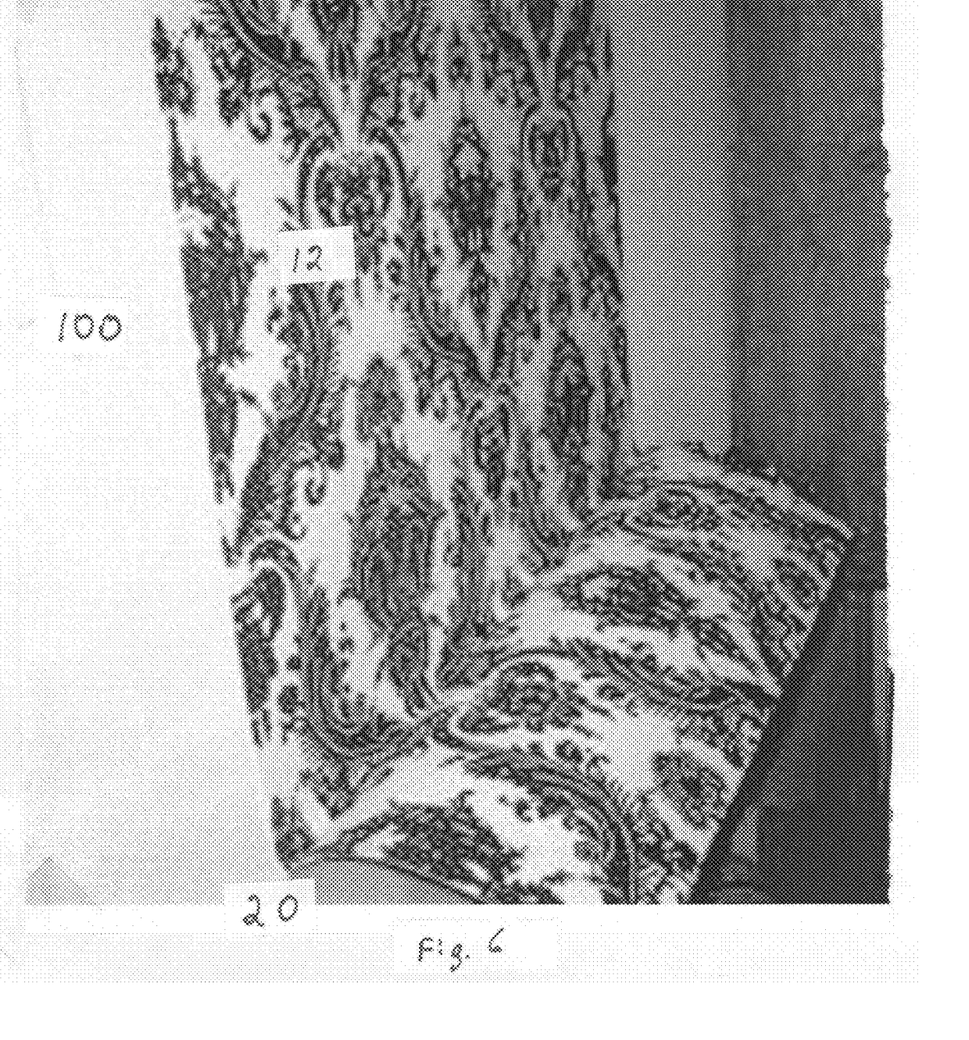
FIG. 6 shows the continuing process of application to a wall surface.
Figure 7:
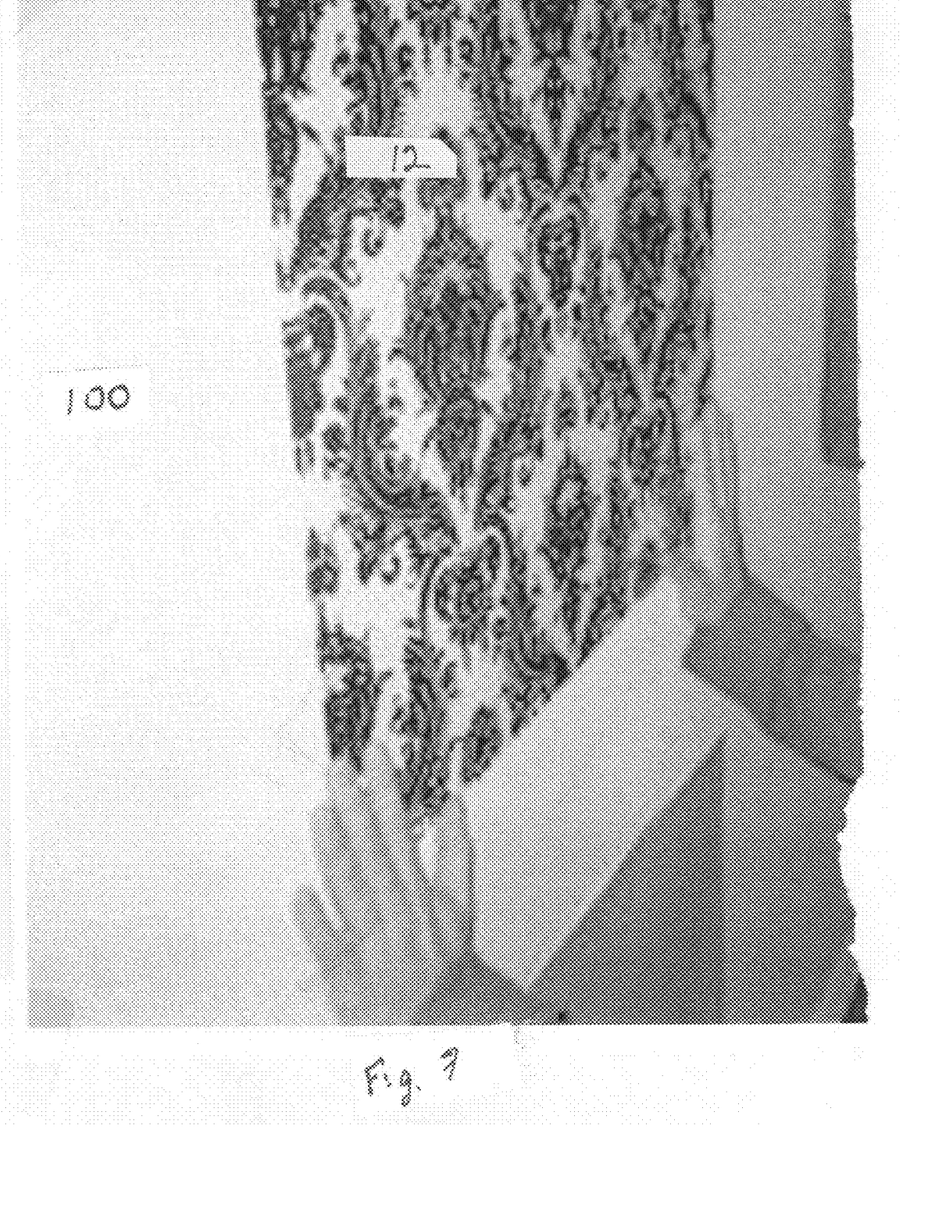
FIG. 7 shows the completed application.

At this point, the backing 20 should be separated from the main (vinyl) paper 12 as described above. To attach the remaining wallpaper, the user should gently remove the remaining backing paper from the vinyl paper and smooth the applied wallpaper against the surface of the wall (FIGS. 4-6). Generally, the backing 20 should be separated by pulling it in a downward direction as the wallpaper is being applied (FIG. 4). As the wallpaper is being applied, it should also be smoothed out, to remove gaps or any air bubbles that might be present. Smoothing can be done manually by the user, such as by use of the forearm or hand, a roll of toweling, an unused paint roller or an equivalent item that the user might already have (FIG. 5).

Choice of Paper

As previously described, the front surface 14 is the decorative surface onto which a design is printed and is facing into the room where the product has been applied. The front surface 14 can have either a glossy finish, or a matte finish, depending upon the overall product design.

Embodiments prepared with a matte finish vinyl were found to be rigid and stiff, making application of the product difficult.

Embodiments prepared with a glossy finish vinyl were found to provide a better print quality than those prepared with the matte finish vinyl, and the glossy finish vinyl was more bendable and flexible to handle than the matte finish vinyl.

Embodiments of the present invention, unlike most wallpapers, can be readily repositioned even during the attachment process, by stopping the attachment, and pulling the wallpaper away from the wall, and then repositioning it at the desired new location.

After the wallpaper has been applied, should the user want to reposition the wallpaper on the wall, or move it to a different wall, the wallpaper can be removed without the use of chemicals, preventing damage to both the wallpaper and the underlying wall. Removal is effected by what is essentially the reverse of the application process. Starting at the top, the user peels back the corners of the attached wallpaper, and while pulling the wallpaper in a downward motion, slowly peels it away from the wall. During this time, the removed wallpaper can be repositioned along the same wall, or repositioned on another wall.

The repositioning of the wallpaper, either on the same wall or a different wall, is done in the same manner as the attachment process, except that there is no longer a liner to be removed during the process. The user needs to be careful that the removed paper doesn't adhere unto itself. One way to prevent such self-adherence could be to attach, temporarily, a liner to the removed paper. One example of such a liner could be a readily available material such as a waxed paper, commonly found in many households. As the wallpaper is being repositioned, the temporary liner is then removed from the wallpaper. Additionally, use of a temporary liner could prevent a random and undesired attachment of the wallpaper to the wall surface. The removed wallpaper could be reused at a later time, providing a liner, such as the initial liner 20, is inserted to prevent the front surface from being attached to itself and/or being damaged.

While currently marketed as an individual product, embodiments of the present invention could also be produced in a kit form, including an application tool, such as a squeegee or roller; a removal tool, such as a scraper or putty knife; and a roll of a liner, such that should the user want to remove the wallpaper and reposition it on another wall at a later time, the liner could be attached to the removed wallpaper, and protect the adhesive and the paper until such time as the wallpaper is reused and applied to another wall. Such a kit could include one or more of these items, or a combination thereof.

Although this invention has been described with a certain degree of particularity, it is to be understood that the present disclosure has been made only by the way of illustration, and that numerous changes in construction and arrangement of parts may be resorted to without departing from the spirit and scope of the invention.

We claim:

1. A repositionable surface covering, comprising:
   a vinyl sheet having a front surface and a rear surface, the front surface further comprising a surface coating, the surface coating capable of having an image printed thereon;
   a removable backing layer comprising a paper and a release agent; and
   a pressure sensitive adhesive disposed between the sheet rear surface and the backing layer, the adhesive being an acrylic emulsion adhesive applied to the rear surface, wherein the adhesive is an acrylic emulsion adhesive characterized by an alkaline pH, a minimum application temperature of +20 degrees F., a service temperature range from 0 degrees F. to +150 degrees F., and regulatory compliances of FDA 21, CFR 175, 105, 176, 170, and 180 for incidental food contact, CONEG, Heavy Metals, ASTM 963a, and Child Toy Safety,
   such that after the backing layer has been separated to expose the adhesive the surface covering can be applied to a surface, and the applied surface covering can be removed from the surface and the surface covering can be repositioned and/or reused.

2. The repositionable surface covering as described in claim 1, wherein after removal from a surface, the removed repositionable surface covering can be reapplied to another surface.

3. The repositionable surface covering as described in claim 1, wherein after removal from a surface, the removed repositionable surface covering can be stored prior to being reused.

4. A repositionable wallpaper, comprising:
- a vinyl sheet having a front surface and a rear surface, the front surface further comprising a surface coating, the surface coating capable of having an image printed thereon;
- a removable backing layer comprising a clay coated kraft paper and a release agent; and
- a pressure sensitive adhesive disposed between the sheet rear surface and the backing layer, the adhesive being an acrylic emulsion adhesive that is applied to the rear surface, the adhesive being characterized by an alkaline pH, a minimum application temperature of +20 degrees F., a service temperature range from 0 degrees F. to +150 degrees F., and regulatory compliances of FDA 21, CFR 175, 105, 176, 170, and 180 for incidental food contact, CONEG, Heavy Metals, ASTM 963a, and Child Toy Safety;
- such that after the backing layer has been separated to expose the adhesive the surface covering can be applied to a surface, and the applied surface covering can be removed from the surface and the surface covering can be repositioned and/or reused, and wherein after removal from a surface, the adhesive layer of the removed repositionable surface covering can be covered with a liner to prevent self-adhesion.

* * * * *